US012716754B2

(12) United States Patent
Liu et al.

(10) Patent No.: US 12,716,754 B2
(45) Date of Patent: Aug. 25, 2026

(54) OPTICAL-SENSING DEMODULATION MODULE AND OPTICAL-SENSING SYSTEM

(71) Applicant: OTN INTELLIGENT TECHNOLOGY (SUZHOU) CO., LTD., Suzhou (CN)

(72) Inventors: Xiaohai Liu, Suzhou (CN); Tianhao Jiang, Suzhou (CN)

(73) Assignee: OTN INTELLIGENT TECHNOLOGY (SUZHOU) CO., LTD., Suzhou (CN)

( * ) Notice: Subject to any disclaimer, the term of this patent is extended or adjusted under 35 U.S.C. 154(b) by 261 days.

(21) Appl. No.: 18/249,371

(22) PCT Filed: Sep. 27, 2022

(86) PCT No.: PCT/CN2022/121877
§ 371 (c)(1),
(2) Date: Apr. 17, 2023

(87) PCT Pub. No.: WO2023/051554
PCT Pub. Date: Apr. 6, 2023

(65) Prior Publication Data

US 2024/0027234 A1 Jan. 25, 2024

(30) Foreign Application Priority Data

Sep. 29, 2021 (CN) .......................... 202111154607.1

(51) Int. Cl.
*G01D 5/26* (2006.01)
*G01B 11/16* (2006.01)
(Continued)

(52) U.S. Cl.
CPC ............. *G01D 5/268* (2013.01); *G01B 11/16* (2013.01); *G01D 5/353* (2013.01); *G02B 6/4246* (2013.01);
(Continued)

(58) Field of Classification Search
CPC ........ H04B 10/40; H04B 10/43; H04B 10/07; H04B 10/071; H04B 10/073;
(Continued)

(56) References Cited

U.S. PATENT DOCUMENTS 5,383,208 A * 1/1995 Queniat ............... H04B 10/564 372/50.1
5,416,871 A * 5/1995 Takahashi .............. H04B 10/25 385/94
(Continued)

FOREIGN PATENT DOCUMENTS

CN 201130028 Y * 10/2008
CN 100574153 C * 12/2009 ............. H04B 10/40
(Continued)

OTHER PUBLICATIONS

Design of the Long Distance Optical Transceiver in the Undersea, Mao et al., Graduate School of National University of Defense Technology, Nov. 2005.
(Continued)

*Primary Examiner* — Gordon J Stock, Jr.
(74) *Attorney, Agent, or Firm* — Smart & Biggar LP

(57) ABSTRACT

Provided are optical-sensing demodulation module and optical-sensing system. Optical-sensing demodulation module includes: package housing, functional circuit, optical receiving assembly, and optical transmitting assembly. The first side surface of the package housing is provided with first fiber optic interface and second fiber optic interface. The second side surface is provided with an electrical interface. The functional circuit is connected with the electrical interface. The optical receiving assembly is connected with the first fiber optic interface and the functional circuit. The optical transmitting assembly is connected with the second fiber optic interface and the functional circuit. The functional circuit is provided near the first side surface. The
(Continued)

optical receiving assembly and optical transmitting assembly are both provided near the second side surface. The optical receiving assembly and the optical transmitting assembly are provided at intervals along direction in which the first fiber optic interface points to the second fiber optic interface.

8 Claims, 2 Drawing Sheets

(51) Int. Cl.
*G01D 5/353* (2006.01)
*G02B 6/42* (2006.01)
*H04B 10/40* (2013.01)
*G01H 9/00* (2006.01)
*G01K 11/3206* (2021.01)

(52) U.S. Cl.
CPC .......... *G02B 6/4278* (2013.01); *H04B 10/40* (2013.01); *G01H 9/004* (2013.01); *G01K 11/3206* (2013.01)

(58) Field of Classification Search
CPC H04B 10/0731; G02B 6/4201; G02B 6/4246; G02B 6/4284; G02B 6/4266; G02B 6/426; G02B 6/4261; G02B 6/4202; G02B 6/4203; G02B 6/4249; G02B 6/425; G02B 6/4256; G02B 6/4278; G02B 6/4286; G02B 6/4251; G02B 6/4274; G01B 11/16; G01K 11/3206; G01H 9/004; G01D 5/268; G01D 5/28; G01D 5/285; G01D 5/30; G01D 5/32; G01D 5/34; G01D 5/353; G01D 5/35303; G01D 5/35306; G01D 5/35309; G01D 5/35312; G01D 5/35316; G01D 5/35319; G01D 5/35322; G01D 5/35325; G01D 5/35329; G01D 5/35332; G01D 5/35335; G01D 5/35338; G01D 5/35341; G01D 5/35345; G01D 5/35348; G01D 5/35351; G01D 5/35354; G01D 5/35358; G01D 5/35361; G01D 5/35364; G01D 5/35367; G01D 5/3537; G01D 5/35374; G01D 5/35377; G01D 5/3538; G01D 5/35383; G01D 5/35387; G01D 5/3539; G01D 5/35393; G01D 5/35396; G01D 5/36; G01D 5/363; G01D 5/366; G01D 5/38
See application file for complete search history.

(56) References Cited

U.S. PATENT DOCUMENTS 5,479,288 A * 12/1995 Ishizuka ............ H04B 10/6911 385/94
5,535,034 A * 7/1996 Taniguchi ............ G02B 6/4246 398/139
6,008,900 A * 12/1999 Green .................... G01H 9/004 250/227.27
6,164,838 A * 12/2000 Maehara .............. G02B 6/4246 361/752
6,923,580 B2 * 8/2005 Ohno ................... G02B 6/4292 385/94
7,127,177 B1 * 10/2006 Weber .................. H04B 10/504 398/137
7,139,488 B1 * 11/2006 Mituhashi ............ G02B 6/4246 398/141
7,215,891 B1 * 5/2007 Chiang .................. H04B 10/40 398/195
7,359,643 B2 * 4/2008 Aronson ................ H04B 10/40 398/136
7,512,291 B2 * 3/2009 Mendoza ............... G02B 6/305 385/12
7,664,401 B2 * 2/2010 Nelson ................. H04B 10/672 398/138
7,680,160 B2 * 3/2010 Stewart ............ H04B 10/07957 372/33
7,941,053 B2 * 5/2011 Dallesasse ............. H04B 10/40 398/139
8,059,415 B2 * 11/2011 Nelson ................. G02B 6/4201 361/752
8,095,015 B2 * 1/2012 Ichino .................... H04B 10/40 398/136
8,111,999 B2 * 2/2012 Ekkizogloy ............ H04B 10/40 398/136
8,142,207 B1 * 3/2012 Ljubijankic ........ H01R 13/6473 439/95
8,184,686 B2 * 5/2012 Wall .......................... H03L 7/08 375/232
8,340,519 B2 * 12/2012 Kim ....................... H04B 10/40 398/100
8,380,073 B2 * 2/2013 Edwards .............. G02B 6/4201 398/164
8,903,254 B2 * 12/2014 Hu ......................... H04B 10/40 398/192
9,054,813 B2 * 6/2015 Margalit ................. H04J 14/00
9,160,451 B2 * 10/2015 Hung ..................... H04B 10/25
9,251,689 B2 * 2/2016 Xiong .................... H04B 10/40
9,407,426 B2 * 8/2016 Blumenthal ............ H04L 7/027
9,438,355 B2 * 9/2016 Blumenthal ....... H04B 10/0793
9,628,195 B2 * 4/2017 Jiang .................... H03K 3/0377
9,660,730 B1 * 5/2017 Rope ................ H04B 10/07953
9,866,329 B2 * 1/2018 Ho ......................... H04B 10/66
9,918,377 B1 * 3/2018 Shen ...................... H05K 3/061
9,923,635 B2 * 3/2018 Ho ...................... H04J 14/0256
10,168,500 B2 * 1/2019 Amit ...................... H04B 10/58
10,291,324 B2 * 5/2019 Aronson ............ H04B 10/0799
10,333,646 B2 * 6/2019 Tian ..................... H04B 10/503
10,444,452 B2 * 10/2019 Noguchi ................ H05K 1/147
10,714,890 B1 * 7/2020 Lin ....................... H01S 5/0014
10,950,651 B2 * 3/2021 Wang ................... G02B 6/4215
11,196,489 B2 * 12/2021 Jin ....................... G02B 6/4261
12,001,069 B2 * 6/2024 Wood ................... G02B 6/4267
12,267,110 B2 * 4/2025 Barlow ............ H04B 10/07955
2003/0161588 A1 * 8/2003 Wolf .................... G02B 6/4257 385/88
2004/0113055 A1 * 6/2004 Whelan .................. G01B 11/18 250/227.18
2005/0168957 A1 * 8/2005 Kawauchi ............ G02B 6/4292 361/783
2006/0034612 A1 * 2/2006 Yu ........................ G02B 6/4246 398/135
2006/0062526 A1 * 3/2006 Ikeuchi .................. H05K 1/189 385/88
2006/0093280 A1 * 5/2006 McColloch .......... G02B 6/4201 385/81
2006/0093379 A1 * 5/2006 Aronson ............ H04B 10/0775 398/208
2006/0098984 A1 * 5/2006 Sakai ..................... H05K 1/148 398/138
2009/0168858 A1 * 7/2009 Luo ........................ H04B 10/40 398/25
2009/0220245 A1 * 9/2009 Yu .......................... H04B 10/40 398/139
2010/0054754 A1 * 3/2010 Miller .................... H04B 10/40 398/162
2010/0166431 A1 * 7/2010 Wu ........................ H04B 10/69 398/202
2011/0038639 A1 * 2/2011 Dickens ................. H04B 10/40 398/140
2011/0135312 A1 * 6/2011 El-Ahmadi ........... H04L 1/0057 714/752
2011/0150475 A1 * 6/2011 Soto ................... H04B 10/2589 398/63
2013/0236188 A1 * 9/2013 Hung ................. H04B 10/2575 398/116

(56) References Cited

U.S. PATENT DOCUMENTS

| | | | | |
|---|---|---|---|---|
| 2016/0380698 | A1* | 12/2016 | Elahmadi | G02B 6/00 398/135 |
| 2017/0048015 | A1* | 2/2017 | O'Daniel | H04B 10/506 |
| 2017/0279533 | A1* | 9/2017 | Elahmadi | H04L 1/0041 |
| 2018/0183540 | A1* | 6/2018 | O'Daniel | H04B 10/40 |
| 2018/0287710 | A1* | 10/2018 | Komatsu | G02B 6/4292 |
| 2018/0351644 | A1* | 12/2018 | Hara | H04B 10/6161 |
| 2020/0145111 | A1* | 5/2020 | Franck | H04B 10/58 |
| 2020/0343990 | A1* | 10/2020 | Nagarajan | H04B 10/40 |
| 2024/0068905 | A1* | 2/2024 | McClean | G01M 11/3154 |
| 2024/0369446 | A1* | 11/2024 | Magri | G01M 11/3118 |

FOREIGN PATENT DOCUMENTS

| | | | | | |
|---|---|---|---|---|---|
| CN | 102183316 | B | * | 4/2013 | |
| CN | 103344265 | A | | 10/2013 | |
| CN | 204177401 | U | * | 2/2015 | |
| CN | 104601244 | A | | 5/2015 | |
| CN | 104655593 | A | | 5/2015 | |
| CN | 103344265 | B | * | 8/2015 | |
| CN | 105318898 | A | * | 2/2016 | G01D 5/268 |
| CN | 105444789 | A | * | 3/2016 | G01D 3/0365 |
| CN | 105703824 | A | * | 6/2016 | |
| CN | 105806374 | A | | 7/2016 | |
| CN | 106100747 | A | | 11/2016 | |
| CN | 107014478 | A | | 8/2017 | |
| CN | 107800486 | A | | 3/2018 | |
| CN | 207081862 | U | * | 3/2018 | |
| CN | 105806374 | B | * | 2/2019 | G01D 5/268 |
| CN | 107014478 | B | * | 3/2019 | G01H 9/002 |
| CN | 208723903 | U | | 4/2019 | |
| CN | 110048778 | A | | 7/2019 | |
| CN | 209120190 | U | * | 7/2019 | |
| CN | 110207735 | A | * | 9/2019 | G01B 11/165 |
| CN | 105634608 | B | * | 11/2019 | |
| CN | 110806233 | A | | 2/2020 | |
| CN | 210075243 | U | | 2/2020 | |
| CN | 111121840 | A | | 5/2020 | |
| CN | 107065083 | B | * | 6/2020 | G02B 6/428 |
| CN | 107204811 | B | * | 7/2020 | H04B 10/691 |
| CN | 212905591 | U | | 4/2021 | |
| CN | 113218364 | A | * | 8/2021 | G01B 11/02 |
| CN | 113701660 | A | | 11/2021 | |
| JP | H11288336 | A | * | 10/1999 | |
| JP | 2019047338 | A | | 3/2019 | |
| WO | WO-2009144962 | A1 | * | 12/2009 | G01D 5/35345 |
| WO | 2014/203040 | A1 | | 12/2014 | |

OTHER PUBLICATIONS

English Abstract translations of Cn 104601244A, Cn 110048778A, and Cn 110806233A.

English translation of the first Office Action issued in CN 202111154607.1 dated Aug. 29, 2023.

English translation of second Office Action issued in CN 202111154607.1 dated Mar. 29, 2024.

First Office Action issued in CN202111154607.1 dated Aug. 29, 2023.

Second Office Action issued in CN202111154607.1 dated Mar. 29, 2024.

Notification to Grant Patent Right for Invention of CN 202111154607.1 dated May 22, 2024.

English Translation of Notification to Grant Patent Right for Invention of CN 202111154607.1.

Supplementary Search Report of CN 2021111546071 dated May 15, 2024 issued by the China National Intellectual Property Administration, 2 pages.

English Translation of Supplementary Search Report of CN 2021111546071 issued by the China National Intellectual Property Administration, 2 pages.

* cited by examiner

OPTICAL-SENSING DEMODULATION MODULE AND OPTICAL-SENSING SYSTEM

CROSS-REFERENCE TO RELATED APPLICATION

The present disclosure claims the priority to the Chinese patent application with the filling No. 202111154607.1 filed with the Chinese Patent Office on Sep. 29, 2021, and entitled "Optical-Sensing Demodulation Module and Optical-Sensing System", the contents of which are incorporated herein by reference in entirety.

TECHNICAL FIELD

The present disclosure relates to the field of photoelectric-sensing technology, in particular to an optical-sensing demodulation module and an optical-sensing system.

BACKGROUND ART

The optical-sensing system is widely used in the field such as aerospace, tunnels and bridges, oil tanks and coal fields, and transportation because of their unique advantages, such as resistance to electromagnetic interference, good electrical insulation, resistance to high temperature and high pressure, and ability of being measured distributedly, which are not available in electrical sensing. An optical-sensing system can be applied to measure a variety of physical quantities such as strain, temperature, and vibration.

Generally, the optical-sensing system includes both sensing and demodulation processes. The sensing process is the modulation for the intensity, the wavelength, the phase and other optical parameters of light by external parameters (e.g., temperature, strain, etc.). Moreover, the demodulation process is opposite to the sensing process, which is an accurate measurement technique that corresponds the variation of the light parameter reflected by the sensor with the variation of the external parameter, that is to say, when the object in the monitored environmental changes, the output light parameters of the optical sensor will have a corresponding offset, and the offset of the light parameters has a certain proportional relationship with the measured variable.

In the prior art, each optical component inside the optical-sensing demodulation instrument requires optical elements such as coupler, collimator, circulator, and filter to assist the optical-sensing demodulation instrument to carry out accurate electro-optical and optical-electro conversion between the transmitter end and receiver end. Therefore, there is no fixed industry standard for optical-sensing demodulators in the prior art, which is large and difficult to integrate, and does not meet the current trend about miniaturization of sensing systems; and the large size also has the disadvantage of inconvenience during installation and operation, which has a small scope of application and is difficult to connect directly with the existing line terminal equipment to achieve online monitoring for the sensing scenes. In addition, since multiple optical elements such as couplers, collimators, circulators, and filters are required, the cost is high and the scope of application is small, which is not suitable for general users.

SUMMARY

The object of the present disclosure is to provide an optical-sensing demodulation module and an optical-sensing system. Due to the reasonable structural layout design, the volume of the optical-sensing demodulation module is reduced.

To achieve the purpose above, the present disclosure in the first aspect provides an optical-sensing demodulation module, comprising: a package housing, a functional circuit, an optical receiving assembly (light receiving assembly), and an optical transmitting assembly (light transmitting assembly), wherein the package housing has a first side surface and a second side surface provided oppositely with each other, wherein the first side surface is provided with a first fiber optic interface and a second fiber optic interface, and the second side surface is provided with an electrical interface; the functional circuit is disposed inside the package housing and closely to the first side surface, and the functional circuit is connected to the electrical interface; the optical receiving assembly is disposed inside the package housing and closely to the second side surface, and the optical receiving assembly connects the first fiber optic interface and the functional circuit and is configured to receive an optical signal input at the first fiber optic interface, convert it into an electrical signal and send it to the functional circuit; the optical transmitting assembly is disposed inside the package housing and closely to the second side surface, and the optical transmitting assembly connects the second optical fiber interface and the functional circuit and is configured to receive an electrical signal input from the functional circuit, convert it into an optical signal and send it to the second fiber optic interface. The optical receiving assembly and the optical transmitting assembly are arranged at intervals along a direction in which the first fiber optic interface points to the second fiber optic interface, and both the optical receiving assembly and the optical transmitting assembly are arranged at intervals with the functional circuit along a direction in which the first side surface points to the second side surface.

In the embodiment, the optical receiving assembly comprises: a photodetector chip, an amplifying circuit, and a digital-to-analog conversion chip, wherein the photodetector chip is connected with the first fiber optic interface; the amplifying circuit is connected with the photodetector chip; and the digital-to-analog conversion chip is connected with the amplifying circuit. The functional circuit comprises: a communication chip and a collection chip, wherein the communication chip is connected with the electrical interface and the digital-to-analog conversion chip, and the collection chip is connected with the electrical interface and the digital-to-analog conversion chip.

In the embodiment, the optical receiving assembly further comprises a current-to-voltage conversion chip connected with the photodetector chip and the amplifying circuit.

In the embodiment, the optical transmitting assembly comprises: a light-emitting element, a driving chip and a temperature-control chip, wherein the light-emitting element is connected with the second fiber optic interface, the driving chip is connected with the light-emitting element, and the temperature-control chip is connected with the light-emitting element; and the functional circuit comprises a control chip connected with the electrical interface, the driving chip and the temperature-control chip.

In the embodiment, the light-emitting element is a laser chip or a light-emitting diode.

In the embodiment, the light-emitting element is a tunable laser chip.

In the embodiment, the driving chip and the temperature-control chip are integrated.

In the embodiment, the control chip and the collection chip are integrated.

In the embodiment, the functional circuit comprises: a power chip connected to the electrical interface.

The present disclosure in the second aspect provides an optical-sensing system, comprising: an upper computer, an optical sensor, a plurality of fiber optics, and at least one optical-sensing demodulation module according to any one of the preceding embodiments, wherein the plurality of fiber optics connect the first fiber optic interface, the optical sensor, and the second fiber optic interface together; and the upper computer is connected with the electrical interface.

Compared with the prior art, the beneficial effects of the present disclosure are described below.

Based on the design of the first fiber optic interface, the second fiber optic interface and the electrical interface on the package housing, the present disclosure encapsulates all the elements in the package housing, which has high degree of integration and is beneficial to connect with other devices. Moreover, the present disclosure is of a compact structure and reduces the size of the optical-sensing demodulation module and the cost through a reasonable structure layout design and a reasonable division for the package housing to install the functional circuit, the optical receiving assembly and the optical transmitting assembly, thus making the optical-sensing demodulation module tend to be miniaturized and standardized, facilitating the installation and operation of the optical-sensing demodulation module, and expanding the scope of application. Therefore, it can be directly used together with OLT (Optical Line Terminal), switches, servers, and other equipment to realize online monitoring of optical-sensing scenarios. In addition, the present disclosure reduces the cost of optical-sensing demodulation module by eliminating the need for multiple optical elements such as couplers, collimators, circulators, and filters.

BRIEF DESCRIPTION OF DRAWINGS

To more clearly illustrate the technical solutions of the embodiments of the present disclosure, the following will briefly introduce the accompanying drawings used in the embodiments. It should be understood that the following drawings only show some embodiments of the present disclosure, and therefore they should not be regarded as a limitation on the scope. Those skilled in art can also obtain other related drawings based on these drawings without inventive effort.

Figure 1:
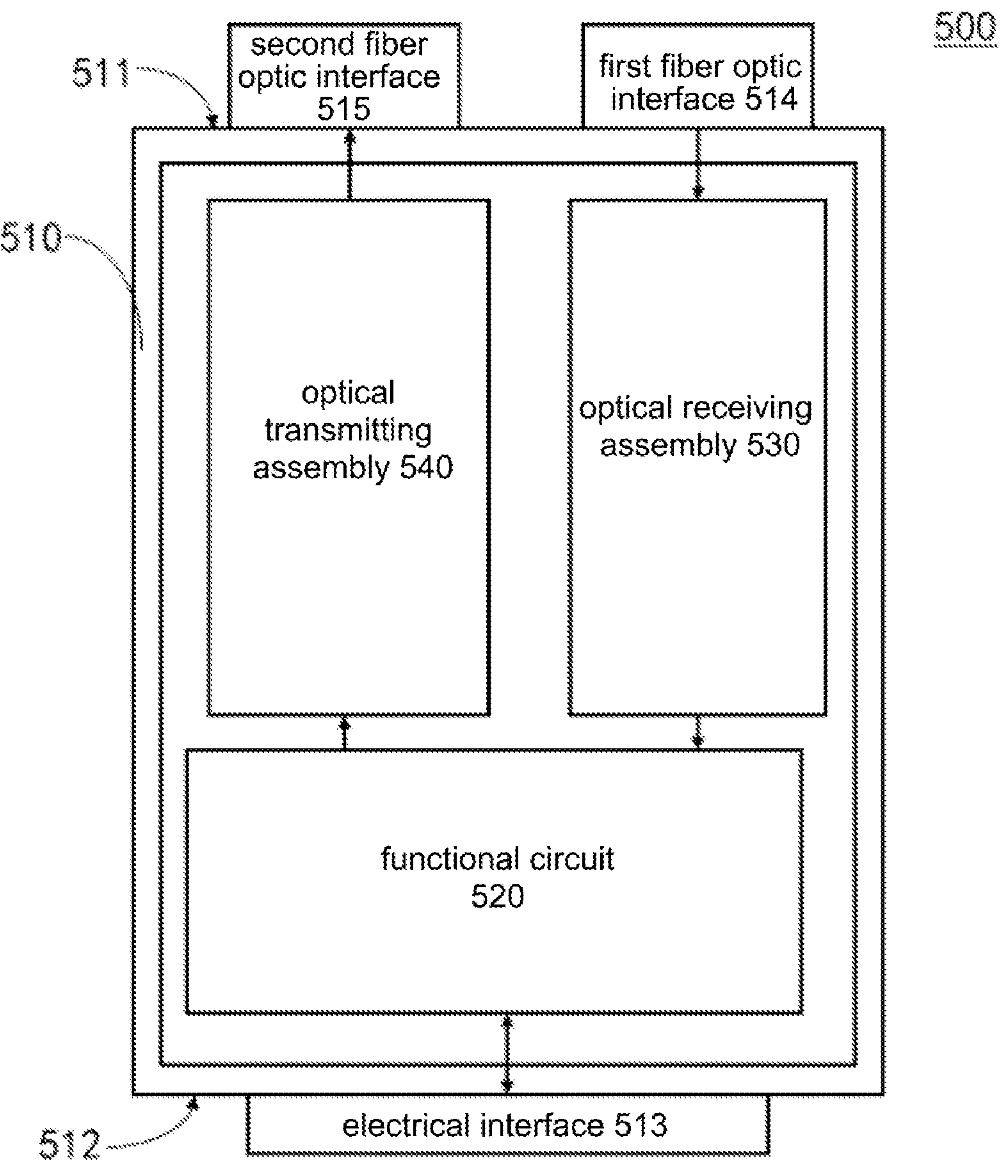
FIG. 1 is a structural schematic diagram of an optical-sensing demodulation module according to the embodiment of the present disclosure.

Reference numerals: 1—optical-sensing system; 200—upper computer; 300—fiber optic; 400—optical sensor; 500—optical-sensing demodulation module; 510—package housing; 511—first side surface; 512—second side surface; 513—electrical interface; 514—first fiber optic interface; 515—second fiber optic interface; 520—functional circuit; 521—power chip; 522—control chip; 523—communication chip; 524—collection chip; 530—optical receiving assembly; 531—photodetector chip; 532—current-to-voltage conversion chip; 533—amplifying circuit; 534—digital-to-analog conversion chip; 540—optical transmitting assembly; 541—light-emitting element; 542—driving chip; 543—temperature-control chip.

DETAILED DESCRIPTION OF EMBODIMENTS

The terms "first", "second", "third", etc. are used only to distinguish descriptions and do not indicate sequential numbering, nor are they to be understood as indicating or implying relative importance.

In addition, the terms "horizontal", "vertical" and "overhang" do not mean that elements are required to be absolutely horizontal or overhanging, but can be slightly inclined. For example, "horizontal" only means that its direction is more horizontal than "vertical", and it does not mean that the structure must be completely horizontal, but can be slightly inclined.

In the description of the present disclosure, it should be noted that the orientation or position relationships indicated by the terms "inside", "outside", "left", "right", "up", "down", etc. are the orientation or position relationships shown based on the attached drawings or the orientation or position relationships customarily placed in the use of the product of the present disclosure. It is only for the convenience of describing the present disclosure and simplifying its description, and does not indicate or imply that the device or element referred to must be in a specific orientation or be constructed and operated in a specific orientation, and thus should not be construed as limiting the present disclosure.

In the description of the present disclosure, unless otherwise clearly stipulated and limited, the terms "provide", "install", "link" and "connect" should be understood in a broad sense, for example, it can be a fixed connection, a detachable connection, or an integral connection, it can be a mechanical connection, or an electrical connection, and it can be a direct connection, an indirect connection through an intermediary, or an internal communication between two components.

The technical solutions of the present disclosure will be clearly and completely described below in conjunction with the accompanying drawings.

Referring to FIG. 1, FIG. 1 is a schematic structural diagram of an optical-sensing demodulation module 500 shown in the embodiment of the present disclosure. An optical-sensing demodulation module 500 comprises: a package housing 510, a functional circuit 520, an optical receiving assembly 530, and an optical transmitting assembly 540, wherein the functional circuit 520, the optical receiving assembly 530, and the optical transmitting assembly 540 are all arranged in the package housing 510. The package housing 510 is provided with a first fiber optic interface 514, a second fiber optic interface 515 and an electrical interface 513, wherein the first fiber optic interface 514 is configured for the input of light, the second fiber optic interface 515 is configured for the output of light, and the electrical interface 513 is configured for the input and output of the electrical signal. The functional circuit 520 is connected to the electrical interface 513. The optical receiving assembly 530 is connected to the first fiber optic interface 514 and the functional circuit 520, which is configured to receive the optical signal input at the first fiber optic interface 514, then convert it into an electrical signal and send it to the functional circuit 520; and the optical transmitting assembly 540 is connected to the second fiber optic interface 515 and the functional circuit 520, which is configured to receive the electrical signal input from the functional circuit

520, then convert it to an optical signal and send it to the second fiber optic interface 515.

In the embodiment, signal demodulation (demodulation of light intensity and wavelength) of the optical sensor 400 can be achieved by converting the electrical signal to an optical signal by the optical transmitting assembly 540 and by converting the optical signal to an electrical signal by the optical receiving assembly 530. Based on the design of the first fiber optic interface 514, the second fiber optic interface 515 and the electrical interface 513 on the package housing in this embodiment, all components such as the functional circuit 520, the optical receiving assembly 530 and the optical transmitting assembly 540 are encapsulated in the package housing, which is highly integrated and facilitates the connection with other devices.

The packaging manner of the optical path of the optical-sensing demodulation module 500 can be CFP (Centum gigabits Form Pluggable), CFP2, CFP4, or CFP8, etc., wherein the volume of the module using CFP2 packaging manner is half of that using CFP packaging manner, the volume of the module using CFP4 packaging manner is one-fourth of that using CFP packaging manner, and the volume of the module using CFP8 packaging manner is the same as that using CFP2 packaging manner. Modules using CFP packaging manner can support 100 Gbps data transmission, which can support either a single 100 G signal or one or more 40 G signals; and modules using CFP8 packaging manner can support 400 G signals.

The CFP packaging method is adopted in this embodiment. The electrical interface 513, the first fiber optic interface 514, and the second fiber optic interface 515 all adopt corresponding types of interfaces in standard CFP packaging manner and have good alignment performance with the optical receiving assembly 530 and the optical transmitting assembly 540. Moreover, because of the CFP packaging method, direct hot plugging is available, which is relatively flexible in configuration, and convenient in communication, so the network can be simplified and failure points can be reduced. Moreover, the performance is more stable and efficient. Furthermore, due to the CFP packaging manner, the physical size of the optical-sensing demodulation module 500 and the cost are reduced, which miniaturizes and standardizes the optical-sensing demodulation module 500, facilitates the installation and operation of the optical-sensing demodulation module 500 and expands its scope of application, which can be directly plugged into OLT (Optical Line Terminal), switch, server, and other equipment to realize online monitoring of optical-sensing scenes. In addition, the embodiment reduces the cost of optical-sensing demodulation module 500 by eliminating the need for multiple optical elements such as couplers, collimators, circulators, and filters.

The material of the package housing can be one or more of metal, ceramic, and plastic. The package housing is not only capable of achieving fixing, installing, and connecting functions, but also protecting the internal chip and enhancing the electrothermal performance. In the embodiment, the material of the package housing 510 is metal. The shape of the package housing 510 is a corresponding standard shape in a standard CFP packaging manner.

The package housing 510 comprises a first side surface 511 and a second side surface 512 that are arranged vertically oppositely, wherein the first side surface 511 is provided with a first fiber optic interface 514 and a second fiber optic interface 515 arranged at intervals in the left-and-right direction, and the second side surface 512 is provided with an electrical interface 513. The functional circuit 520 is arranged closely to the first side surface 511; and the optical receiving assembly 530 and the optical transmitting assembly 540 are both arranged closely to the second side surface 512, wherein the optical receiving assembly 530 and the optical transmitting assembly 540 are arranged at intervals transversely along a direction in which the first fiber optic interface 514 points to the second fiber optic interface 515, and both of the optical receiving assembly 530 and the optical transmitting assembly 540 are arranged at intervals vertically with the functional circuit 520 along a direction in which the first side surface 511 points to the second side surface 512. With this arrangement, the structure is compact and the layout is reasonable, which further reduces the size and cost of the optical-sensing demodulation module 500, so as to miniaturize and standardize the optical-sensing demodulation module 500.

Figure 2:
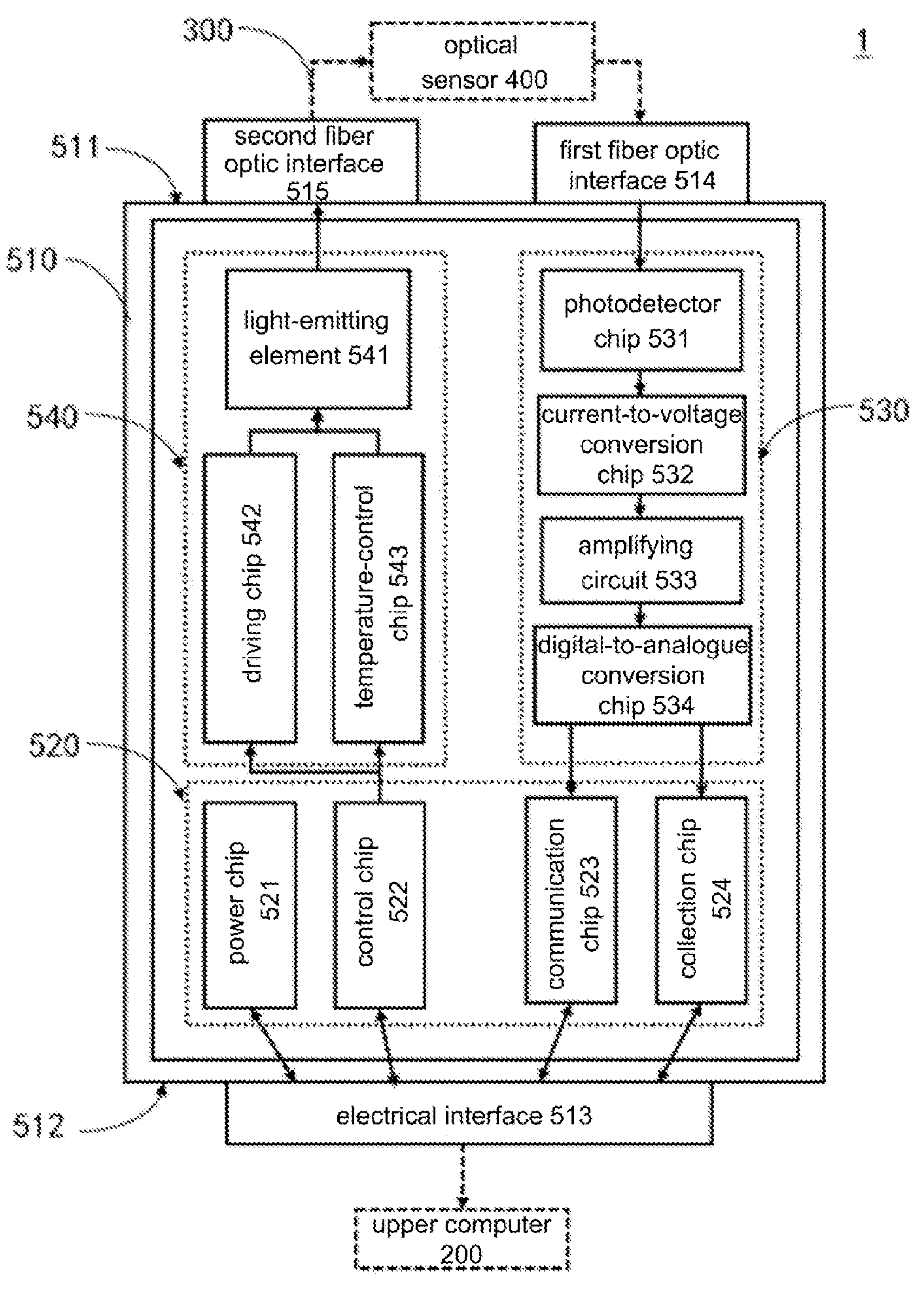
FIG. 2 is a structural schematic diagram of an optical-sensing system according to the embodiment of the present disclosure.

Referring to FIG. 2, FIG. 2 is a schematic structural diagram of an optical-sensing system 1 shown in the embodiment of the present disclosure. The optical-sensing system 1 comprises an upper computer 200, an optical sensor 400, a plurality of fiber optics 300, and at least one optical-sensing demodulation module 500, wherein the plurality of fiber optics 300 connect the first fiber optic interface 514, the optical sensor 400, and the second fiber optic interface 515 together; and the upper computer 200 is connected with the electrical interface 513. In this embodiment, there is one optical-sensing demodulation module 500 and two fiber optics 300.

The optical receiving assembly 530 comprises a photodetector chip 531, a current-to-voltage conversion chip 532, an amplifying circuit 533, and a digital-to-analog conversion chip 534 connected in sequence, wherein an end of the photodetector chip 531 is connected to the first fiber optic interface 514 and the other end is connected to the current-to-voltage conversion chip 532, which is configured to receive the optical signal input from the fiber optic 300 at the first fiber optic interface 514, convert the optical signal into an electrical signal and output it to the current-to-voltage conversion chip 532. The functional circuit 520 comprises: a communication chip 523 and a collection chip 524, wherein the communication chip 523 is connected with the electrical interface 513 and the digital-to-analog conversion chip 534 for communication, and the collection chip 524 is connected with the electrical interface 513 and the digital-to-analog conversion chip 534 for data collection.

The optical transmitting assembly 540 comprises a light-emitting element 541, a driving chip 542, and a temperature-control chip 543, wherein the light-emitting element 541 can be a laser chip, light-emitting diode or other small light sources; and the light-emitting element 541 is connected to the second fiber optic interface 515, wherein the light emitted by the light-emitting element 541 is capable of being output via the fiber optic 300 at the second fiber optic interface 515. The driving chip 542 is connected to the light-emitting element 541, which is configured to drive the light-emitting device 541 to emit light; and the temperature-control chip 543 is connected to the light-emitting element 541, which is configured to control the temperature of the light-emitting element 541.

The functional circuit 520 comprises a control chip 522 connected to the electrical interface 513, the driving chip 542, and the temperature-control chip 543, wherein the control chip 522 can receive the electrical signal input at the electrical interface 513 and control the light-emitting element 541 through the driving chip 542 and the temperature-control chip 543.

The functional circuit 520 also comprises a power chip 521 connected to the electrical interface 513, wherein the power chip 521 is capable of being connected to a slot of the upper computer 200 through the electrical interface 513, which is configured to supply power to various components of the optical-sensing demodulation module 500. The power chip 521 is capable of being selected according to the adaptation voltage of each component of the optical-sensing demodulation module 500.

The components of the optical-sensing demodulation module 500 are capable of being split or integrated as a whole as required, for example, the driving chip 542 and the temperature-control chip 543 can be split or integrated, and the control chip 522 and the collection chip 524 can be split or integrated. In the embodiment, to further reduce the volume of the optical-sensing demodulation module 500, the driving chip 542 and the temperature-control chip 543 are integrated as a whole, and the control chip 522 and the collection chip 524 are integrated as a whole.

During the operation, the upper computer 200 controls the driving chip 542 and the temperature-control chip 543 through the control chip 522; and the light-emitting element 541 emits a stable optical signal with a fixed intensity by the joint action of the driving chip 542 and the temperature-control chip 543, wherein the optical signal emitted by the light-emitting element 541 is output to the optical sensor 400 through the collimated second fiber optic interface 515 and the fiber optic 300. The optical sensor 400 modulates the optical signal and then transmits it to the photodetector chip 531 via the fiber optic 300 and the first fiber optic interface 514; and the photodetector chip 531 converts the modulated optical signal into a current signal and then transmits it to the current-to-voltage conversion chip 532. The current-to-voltage conversion chip 532 converts the current signal into a voltage signal satisfying a certain relationship and then transmits it to the amplifying circuit 533. The amplifying circuit 533 amplifies the voltage signal and then outputs an electrical signal with a corresponding code rate to the digital-to-analog conversion chip 534; and the digital-to-analog conversion chip 534 converts it into an analog signal and a digital signal, which is transmitted to the upper computer 200 through the communication chip 523 and the collection chip 524. In this way, the online monitoring of light-sensing scenes can be realized.

In another embodiment, the photodetector chip 531 is of a photovoltaic type, and the optical receiving assembly 530 does not include a current-to-voltage conversion chip 532, wherein the voltage signal is directly output through the photodetector chip 531 of photovoltaic type.

In another embodiment, the optical sensor 400 can be of a wavelength-modulated type, for example, a fiber grating sensor, a Fabry-Perot sensor, or the like. To adapt the wavelength-modulated optical sensor 400, the light-emitting element 541 is a tunable laser chip with a tunable wavelength. In order not to affect the accuracy of the optical-sensing system 1, the wavelength of the tunable laser chip needs to be continuously adjustable, and the wavelength interval can be 1 pm, wherein the smaller the wavelength interval is, the higher the accuracy is. The relationship between the input voltage (or current) of the light-emitting element 541 and the output wavelength can be available by the product parameters of the selected tunable laser chip.

The upper computer 200 controls the input voltage (or current) to control the light-emitting element 541 to output the light from low-band to high-band (wherein the range of wavelength tuning can be 1530 nm-1625 nm) at a certain wavelength interval (wherein the wavelength interval can be 1 pm). Meanwhile, the optical receiving assembly 530 collects the light intensity output by the optical sensor 400 at each wavelength interval and uploads the detected optical power signal to the upper computer 200 to obtain a corresponding relationship between the discrete light wavelength and the output light intensity of the optical sensor 400. According to the corresponding relationship, the curve of spectrum can be drawn, which enables the demodulation of the optical sensor 400 of a wavelength-modulated type based on the data processing result.

The drawing of the curve of spectrum can be as follows: as for the upper computer 200, a horizontal coordinate is the light wavelength output by the light-emitting element 541, and a vertical coordinate is the light intensity collected by the optical receiving assembly 530; and data points of light intensity at each wavelength are plotted into the coordinate system, then the discrete data points are connected by a smooth curve.

The data processing procedure for the demodulation of the optical sensor 400 of a wavelength-modulated type can be as follows: the upper computer 200 performs the comparison and peak-searching between the curve of spectrum and the spectrum of the light-emitting element 541, wherein the horizontal coordinate of the obtained peak point is the central wavelength of the optical sensor 400 and the vertical coordinate of the peak point is converted.

In another embodiment, the optical sensor 400 can be of a wavelength-modulated type, and the light-emitting element 541 is an assembly of a broadband light source and a tunable filter.

The response time of the photodetector chip 531 in this embodiment is required to be less than or equal to 1 ns, and the response speed of the photodetector chip 531 is fast, which avoids affecting the rate of the optical-sensing system 1. Furthermore, the photodetector chip 531, in the case of meeting the sensor sampling resolution and sensitivity, should have as low detection limit intensity as possible, which needs to be less than or equal to −16 dBm. Thus, it is capable of eliminating the impact due to the large optical loss caused by the optical sensor 400, so as to avoid affecting the sensitivity of optical-sensing system 1.

The resolution of the analog-to-digital conversion of the collection chip 524 needs to be greater than or equal to 16 bits, then the resolution of the analog-to-digital conversion of the collection chip 524 is high and the accuracy of the optical-sensing system 1 is high. Further, the sampling frequency of the collection chip 524 needs to be greater than or equal to 10 kHz, then the sampling frequency of the collection chip 524 is high and the rate of the optical-sensing system 1 is high.

When the light-emitting element 541 is a laser chip or a laser module, its power should be as large as possible while maintaining stability, which needs to be greater than or equal to −5 dBm, then it is capable of eliminating that the impact due to the large optical loss caused by the optical sensor 400. Therefore, it avoids affecting the sensitivity of the optical-sensing system 1. In addition, the parameter of device coupling-efficiency stability of the light-emitting element 541 in the optical transmitting assembly 540 needs to be less than or equal to ±0.02 dB/hour, which improves the stability of the optical transmitting assembly 540 without affecting the accuracy of the optical-sensing system 1.

In summary, each component of the optical transmitting assembly 540 and the optical receiving assembly 530 in the embodiment is reasonably designed, such that it is available for optical-sensing application scenarios and also meets the requirements for the high-performance optical-sensing demodulation.

It should be noted that the features in the embodiments of the present disclosure may be combined without conflict.

The above is only a preferred embodiment of the present disclosure, which is not intended to limit, and the present disclosure may have various changes and variations for those skilled in the art. Any modification, equivalent substitution, improvement, and so on made within the spirit and principles of the present disclosure shall be included in the scope of protection of the present disclosure.

What is claimed is:

1. An optical-sensing demodulation module, wherein the optical-sensing demodulation module comprises:

a package housing, comprising a first side surface and a second side surface arranged oppositely to each other, wherein the first side surface is provided with a first fiber optic interface and a second fiber optic interface, and the second side surface is provided with an electrical interface;

a functional circuit, disposed inside the package housing and closer to the second side surface than to the first side surface, wherein the functional circuit is connected to the electrical interface;

an optical receiving assembly, inside the package housing and closer to the first side surface than to the second side surface, wherein the optical receiving assembly is connected to the first optical fiber interface and the functional circuit, and configured to receive an optical signal input at the first fiber optic interface, convert the optical signal into an electrical signal and send the electrical signal to the functional circuit; and an optical transmitting assembly, inside the package housing and closer to the first side surface than to the second side surface, wherein the optical transmitting assembly is connected to the second optical fiber interface and the functional circuit, and configured to receive an electrical signal input from the functional circuit, convert the electrical signal into an optical signal and send the optical signal to the second fiber optic interface, wherein the optical receiving assembly is spaced apart from the optical transmitting assembly along a direction from the first fiber optic interface toward the second fiber optic interface, and both the optical receiving assembly and the optical transmitting assembly are spaced apart from the functional circuit along a direction from the first side surface toward the second side surface;

wherein the optical transmitting assembly comprises:

a light-emitting element, connected with the second fiber optic interface, a driving chip, connected with the light-emitting element, and a temperature-control chip, connected with the light-emitting element; and wherein the functional circuit comprises:

a control chip, connected to the electrical interface, the driving chip, and the temperature-control chip;

wherein the optical receiving assembly comprises:

a photodetector chip, connected with the first fiber optic interface, an amplifying circuit, connected with the photodetector chip, and a digital-to-analog conversion chip, connected to the amplifying circuit; and wherein the functional circuit comprises:

a communication chip, connected with the electrical interface and the digital-to-analog conversion chip, and a collection chip, connected to the electrical interface and the digital-to-analog conversion chip.

2. The optical-sensing demodulation module according to claim 1, wherein the optical receiving assembly further comprises:

a current-to-voltage conversion chip, connected with the photodetector chip and the amplifying circuit.

3. The optical-sensing demodulation module according to claim 1, wherein the light-emitting element is a laser chip or a light-emitting diode.

4. The optical-sensing demodulation module according to claim 1, wherein the light-emitting element is a tunable laser chip.

5. The optical-sensing demodulation module according to claim 1, wherein the driving chip and the temperature-control chip are integrated.

6. The optical-sensing demodulation module according to claim 1, wherein the control chip and the collection chip are integrated.

7. The optical-sensing demodulation module according to claim 1, wherein the functional circuit comprises:

a power chip, connected to the electrical interface.

8. An optical-sensing system, wherein the optical-sensing system comprises:

an optical sensor;

at least one optical-sensing demodulation module according to claim 1;

a plurality of fiber optics, connecting the first fiber optic interface, the optical sensor, and the second fiber optic interface; and an upper computer, connected to the electrical interface.

* * * * *